US012327672B2

(12) United States Patent
Wakabayashi

(10) Patent No.: US 12,327,672 B2
(45) Date of Patent: Jun. 10, 2025

(54) COIL COMPONENT AND METHOD OF MANUFACTURING THE SAME

(71) Applicant: TAIYO YUDEN CO., LTD., Tokyo (JP)

(72) Inventor: Hirotaka Wakabayashi, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 1142 days.

(21) Appl. No.: 17/187,155

(22) Filed: Feb. 26, 2021

(65) Prior Publication Data

US 2021/0272740 A1 Sep. 2, 2021

(30) Foreign Application Priority Data

Feb. 29, 2020 (JP) ................................ 2020-034486
Nov. 4, 2020 (JP) ................................ 2020-184044

(51) Int. Cl.
*H01F 27/29* (2006.01)
*H01F 27/28* (2006.01)
*H01F 41/04* (2006.01)

(52) U.S. Cl.
CPC ......... *H01F 27/29* (2013.01); *H01F 27/2804* (2013.01); *H01F 41/041* (2013.01); *H01F 2027/2809* (2013.01)

(58) Field of Classification Search
CPC .... H01F 27/29; H01F 27/2804; H01F 41/041; H01F 2027/2809
See application file for complete search history.

(56) References Cited

U.S. PATENT DOCUMENTS

2008/0073108 A1* 3/2008 Saito .................... H01G 4/2325 174/256
2015/0022940 A1* 1/2015 Han ......................... H01G 4/30 252/514

(Continued)

FOREIGN PATENT DOCUMENTS

JP 2008-085280 A 4/2008
JP 2008263013 A * 10/2008

(Continued)

OTHER PUBLICATIONS

Notice of Reasons for Refusal dated Jun. 11, 2024, issued in corresponding Japanese Patent Application No. 2020-184044, with English translation (11 pgs.).

*Primary Examiner* — Malcolm Barnes
(74) *Attorney, Agent, or Firm* — Pillsbury Winthrop Shaw Pittman, LLP

(57) ABSTRACT

Provided is a coil component having an increased adhesion strength between an electrode layer and a plating layer included in an external electrode. A coil component according to an embodiment of the present invention includes: a base body; an external electrode provided on a surface of the base body; and a conductor electrically connected to the external electrode and wound around a coil axis, wherein the external electrode includes a first electrode layer, a second electrode layer covering the first electrode layer, and a plating layer covering the second electrode layer, wherein each of the first electrode layer and the second electrode layer contains a plurality of fillers and a resin, and wherein a proportion of a volume of the plurality of fillers in the second electrode layer is larger than a proportion of a volume of the plurality of fillers in the first electrode layer.

15 Claims, 9 Drawing Sheets

(56) References Cited

U.S. PATENT DOCUMENTS

| | | | | |
|---|---|---|---|---|
| 2016/0099106 | A1* | 4/2016 | Kurokawa | H01G 4/12 336/200 |
| 2016/0351322 | A1* | 12/2016 | Banba | H01F 17/04 |
| 2017/0186549 | A1 | 6/2017 | Kurokawa et al. | |
| 2017/0186550 | A1 | 6/2017 | Kurokawa et al. | |
| 2017/0263382 | A1 | 9/2017 | Kurokawa et al. | |
| 2017/0287644 | A1 | 10/2017 | Kurokawa et al. | |
| 2017/0365413 | A1 | 12/2017 | Kurokawa et al. | |

FOREIGN PATENT DOCUMENTS

| | | | |
|---|---|---|---|
| JP | 2015-023268 | A | 2/2015 |
| JP | 2015-053495 | A | 3/2015 |
| JP | 2017-120809 | A | 7/2017 |

* cited by examiner

COIL COMPONENT AND METHOD OF MANUFACTURING THE SAME

CROSS-REFERENCE TO RELATED APPLICATIONS

This application is based on and claims the benefit of priority from Japanese Patent Application Serial No. 2020-034486 (filed on Feb. 29, 2020) and Japanese Patent Application Serial No. 2020-184044 (filed on Nov. 4, 2020), the contents of which are hereby incorporated by reference in their entirety.

TECHNICAL FIELD

The present disclosure relates to a coil component and a method of manufacturing the coil component.

BACKGROUND

A conventional coil component such as an inductor typically includes a magnetic base body made of a magnetic material, a conductor provided in the magnetic base body and wound around a coil axis, and an external electrode connected to an end portion of the conductor. Such a coil component is mounted on a substrate, for example, through electric connection between the external electrode and the substrate soldered to each other, for use as a component of various electronic devices. An example of the conventional coil component is disclosed in Japanese Patent Application Publication No. 2017-120809 ("the '809 Publication"). In the coil component of the '809 Publication, the external electrode includes an electrode layer formed by heat-treating a conductive paste containing metal fillers and a resin.

When the electrode layer is formed using the conductive paste containing metal fillers and a resin, it is common to provide a plating layer on the electrode layer. In order to improve the tight adhesion between the electrode layer and the base material, it is desirable to increase the proportion of the resin contained in the electrode layer. However, when the electrode layer contains a larger proportion of resin, a structural defect tends to form in the plating layer being grown on the electrode layer. As a result, the adhesion strength between the electrode layer and the plating layer may be reduced.

SUMMARY

One object of the present invention is to provide a coil component having an increased adhesion strength between the electrode layer and the plating layer included in the external electrode. Other objects of the present invention will be made apparent through the entire description in the specification.

A coil component according to an embodiment of the present invention is a coil component comprising: a base body; an external electrode provided on a surface of the base body; and a conductor electrically connected to the external electrode and wound around a coil axis, wherein the external electrode includes a first electrode layer, a second electrode layer covering the first electrode layer, and a plating layer covering the second electrode layer, wherein each of the first electrode layer and the second electrode layer contains a plurality of fillers and a resin, and wherein a proportion of a volume of the plurality of fillers in the second electrode layer is larger than a proportion of a volume of the plurality of fillers in the first electrode layer.

In one embodiment of the present invention, a proportion of a volume of the resin in the first electrode layer may be larger than a proportion of a volume of the resin in the second electrode layer.

In one embodiment of the present invention, adhesion strength between the first electrode layer and the base body may be higher than adhesion strength between the second electrode layer and the base body.

In one embodiment of the present invention, a proportion of the resin in the first electrode layer may be 65 vol % or smaller.

In one embodiment of the present invention, the plurality of fillers may be formed of a metal material.

In one embodiment of the present invention, the plurality of fillers may include first fillers and second fillers, and an aspect ratio of the first fillers may be 2 or smaller, and an aspect ratio of the second fillers may be 3 or larger.

In one embodiment of the present invention, among the plurality of fillers contained in the second electrode layer, a proportion of the first fillers may be 40 vol % to 70 vol %, and a proportion of the second fillers may be 30 vol % to 60 vol %.

In one embodiment of the present invention, at least a part of the plurality of fillers contained in the second electrode layer may be metal-bonded to the plating layer.

In one embodiment of the present invention, the plating layer may include a first plating layer contacting with the second electrode layer and formed of Ni.

In one embodiment of the present invention, the first plating layer may cover an entire outer surface of the second electrode layer.

In one embodiment of the present invention, the resin may be a thermosetting resin.

One embodiment of the present invention relates to a circuit board comprising any one of the above electronic components. One embodiment of the present invention relates to an electronic device comprising the above circuit board.

Advantageous Effects

The present invention is a coil component having an increased adhesion strength between the electrode layer and the plating layer included in the external electrode.

DESCRIPTION OF THE PREFERRED EMBODIMENTS

Various embodiments of the present invention will be hereinafter described with reference to the accompanying drawings. The constituents common to more than one drawing are denoted by the same reference signs throughout the drawings. For convenience of explanation, the drawings are not necessarily drawn to scale.

Figure 1:
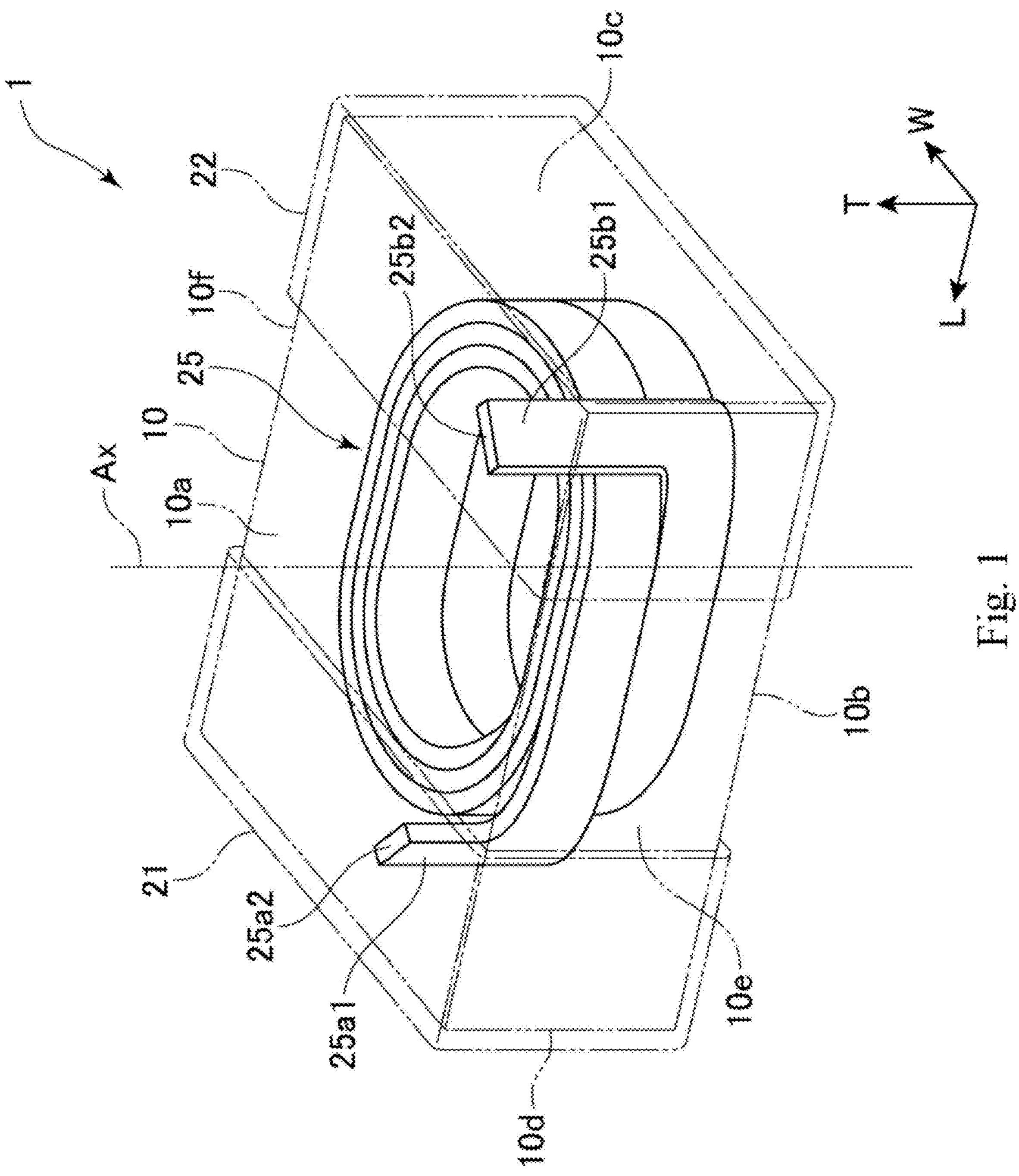
FIG. 1 is a perspective view schematically showing a coil component according to one embodiment of the present invention.

A coil component 1 according to one embodiment of the present invention will be hereinafter outlined with reference to FIG. 1. FIG. 1 is a perspective view schematically showing the coil component 1. As shown in FIG. 1, the coil component 1 includes a base body 10, a coil conductor (a conductor) 25 provided in the base body 10, an external electrode 21 disposed on a surface of the base body 10, and an external electrode 22 disposed on the surface of the base body 10 at a position spaced apart from the external electrode 21.

In this specification, a "length" direction, a "width" direction, and a "height" direction of the coil component 1 correspond to the "L axis" direction, the "W axis" direction, and the "T axis" direction in FIG. 1, respectively, unless otherwise construed from the context.

The coil component 1 is mounted on a circuit board (not shown). The circuit board has two land portions provided thereon. The coil component 1 may be mounted on the circuit board by bonding the external electrodes 21, 22 to the land portions corresponding to the external electrodes 21, 22, respectively. The circuit board can be installed in electronic devices such as smartphones, tablets, game consoles, and various others. The circuit board may also be installed in an electric component of an automobile, which is a sort of electronic device.

The coil component 1 may be applied to inductors, transformers, filters, reactors, and various other coil components having the external electrodes 21, 22 on the surface of the base body 10. The coil component 1 may also be applied to coupled inductors, choke coils, and various other magnetically coupled coil components. Applications of the coil component 1 are not limited to those explicitly described herein.

The base body 10 is made of an insulating material. In one embodiment, the base body 10 is made mainly of a magnetic material and formed in a rectangular parallelepiped shape. In the coil component 1 according to one embodiment of the invention, the base body 10 has a length (the dimension in the L axis direction) of 1.0 mm to 4.5 mm, a width (the dimension in the W axis direction) of 0.5 mm to 3.2 mm, and a height (the dimension in the T axis direction) of 0.5 mm to 5.0 mm. The dimensions of the base body 10 are not limited to those specified herein. The term "rectangular parallelepiped" or "rectangular parallelepiped shape" used herein is not intended to mean solely "rectangular parallelepiped" in a mathematically strict sense.

The base body 10 has a first principal surface 10*a*, a second principal surface 10*b*, a first end surface 10*c*, a second end surface 10*d*, a first side surface 10*e*, and a second side surface 10*f*. These six surfaces define the outer periphery of the base body 10. The first principal surface 10*a* and the second principal surface 10*b* are at the opposite ends in the height direction, the first end surface 10*c* and the second end surface 10*d* are at the opposite ends in the length direction, and the first side surface 10*e* and the second side surface 10*f* are at the opposite ends in the width direction.

As shown in FIG. 1, the first principal surface 10*a* lies on the top side of the base body 10, and therefore, the first principal surface 10*a* may be herein referred to as "the top surface." Similarly, the second principal surface 10*b* may be referred to as "the bottom surface." The coil component 1 is disposed such that the first principal surface 10*a* faces the circuit board, and therefore, the first principal surface 10*a* may be herein referred to as "the mounting surface." The top-bottom direction of the coil component 1 mentioned herein refers to the top-bottom direction in FIG. 1.

Figure 2:
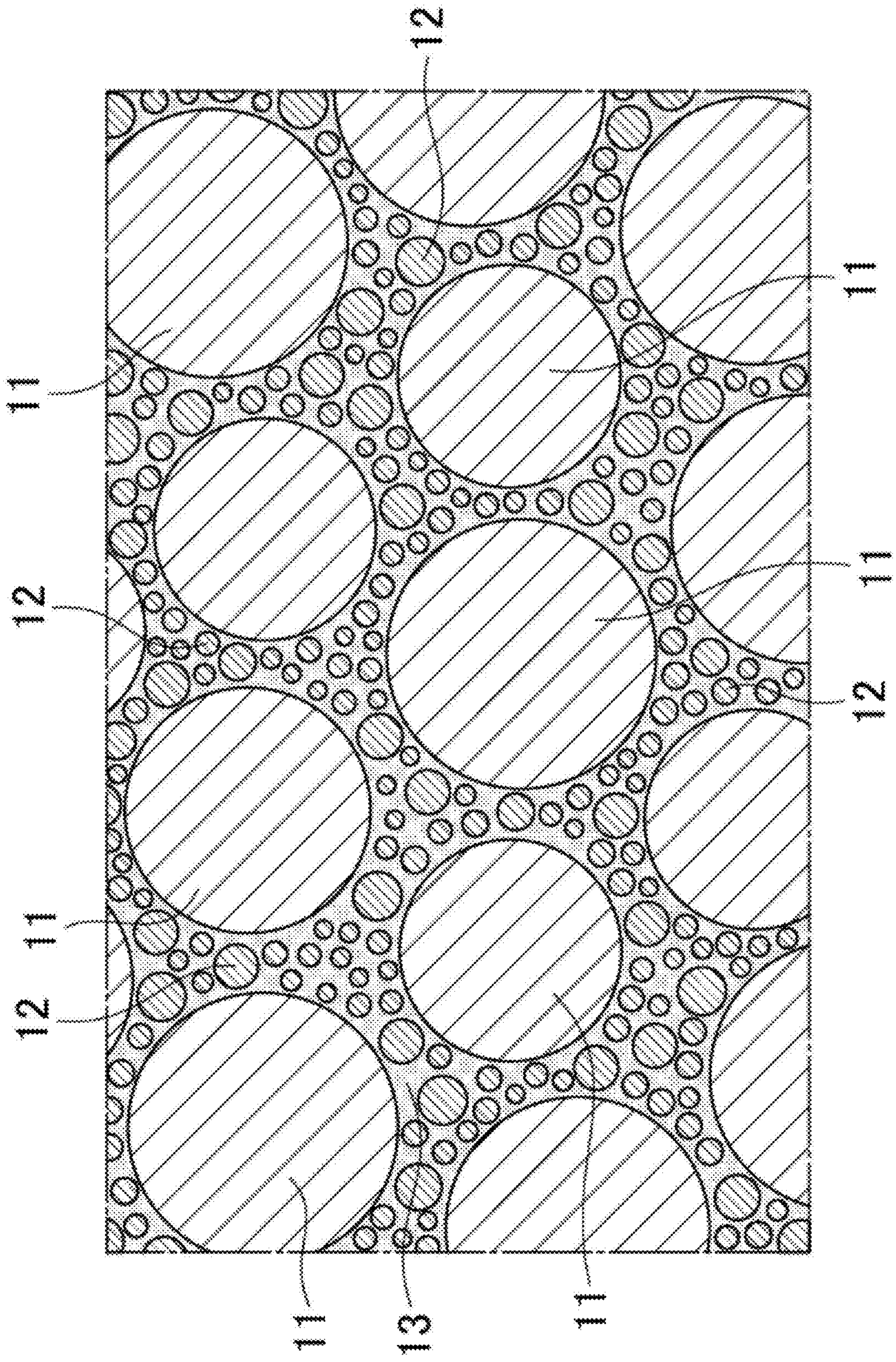
FIG. 2 is an enlarged sectional view schematically showing, on an enlarged scale, a sectional surface of a magnetic base body of the coil component shown in FIG. 1.

Next, the base body 10 which is magnetic will be further described with reference to FIG. 2. FIG. 2 is an enlarged sectional view schematically showing, on an enlarged scale, a sectional surface of the base body 10. As shown in the drawing, the base body 10 contains a plurality of first metal magnetic particles 11, a plurality of second metal magnetic particles 12, and a binder 13. The binder 13 binds together the plurality of first metal magnetic particles 11 and the plurality of second metal magnetic particles 12. In other words, the base body 10 is formed of the binder 13 and the plurality of first metal magnetic particles 11 and the plurality of second metal magnetic particles 12 bound to each other by the binder 13. The base body 10 may contain a dielectric material as a magnetic material or a non-magnetic material.

The plurality of first metal magnetic particles 11 have a larger average particle size than the plurality of second metal magnetic particles 12. That is, the average particle size of the plurality of first metal magnetic particles 11 (hereinafter referred to as the first average particle size) is different from the average particle size of the plurality of second metal magnetic particles 12 (hereinafter referred to as the second average particle size). For example, the first average particle size is 30 μm, and the second average particle size is 2 μm, but these are not limitative. In one embodiment of the present invention, the base body 10 may further contain a plurality of third metal magnetic particles (not shown) having an average particle size different from the first average particle size and the second average particle size (the average particle size of the third metal magnetic particles is hereinafter referred to as the third average particle size). The third average particle size may be smaller than the first average particle size and larger than the second average particle size, or it may be smaller than the second average particle size. The first metal magnetic particles 11, the second metal magnetic particles 12, and the third metal magnetic particles contained in the magnetic base body 10 may be hereinafter collectively referred to as "the metal magnetic particles" when they need not be distinguished from one another.

The first metal magnetic particles 11 and the second metal magnetic particles 12 can be formed of various soft magnetic materials. For example, a main ingredient of the first metal magnetic particles 11 is Fe. Specifically, the first metal magnetic particles 11 are particles of (1) a metal such as Fe or Ni, (2) a crystalline alloy such as an alloy containing Fe, Si, and Cr, an alloy containing Fe, Si, and Al, or an alloy containing Fe and Ni, (3) an amorphous alloy such as an alloy containing Fe, Si, Cr, B, and C or an alloy containing Fe, Si, Cr, and B, or (4) a mixture thereof. The composition of the metal magnetic particles contained in the magnetic base body 10 is not limited to those described above. The first metal magnetic particles 11 may contain, for example, 85 wt % or more Fe. This provides the magnetic base body 10 with an excellent magnetic permeability. The composition of the second metal magnetic particles 12 is either the same as or different from that of the first metal magnetic particles 11. When the magnetic base body 10 contains the plurality of third metal magnetic particles (not shown), the composition of the third metal magnetic particles is either the same as or different from that of the first metal magnetic particles 11, as with the second metal magnetic particles 12.

The surfaces of the metal magnetic particles may be coated with insulating films (not shown). The insulating films are formed of, for example, a glass, a resin, or other materials having a high insulating property. For example, the insulating films are formed on the surfaces of the first metal magnetic particles 11 by mixing the first metal magnetic particles 11 with powder of a glass material in a friction mixer (not shown). The insulating films formed of the glass material are adhered to the surfaces of the first metal magnetic particles 11 by the compression friction action in the friction mixer. The glass material may contain ZnO and $P_2O_5$. The insulating films may be formed of various glass materials. The insulating films 14 may be formed of alumina powder, zirconia powder, or any other oxide powders having a high insulating property, in place of or in addition to the glass powder. The thickness of the insulating films is, for example, 100 nm or smaller.

The second metal magnetic particles 12 may be coated with different insulating films than the first metal magnetic particles 11. The insulating films may be oxide films formed by oxidation of the second metal magnetic particles 12. The thickness of the insulating films is, for example, 20 nm or smaller. The insulating films may be oxide films formed on the surfaces of the second metal magnetic particles 12 by heat-treating the second metal magnetic particles 12 in the atmosphere. The insulating films may be oxide films containing oxides of Fe and other elements contained in the second metal magnetic particles 12. These insulating films may be iron phosphate films formed on the surfaces of the second metal magnetic particles 12 by placing the second metal magnetic particles 12 into phosphoric acid and stirring. The insulating films of the first metal magnetic particles 11 may be oxide films formed by oxidation of the first metal magnetic particles 11, whereas the insulating films of the second metal magnetic particles 12 may be coating films formed by a method other than oxidation of the second metal magnetic particles 12.

The binder 13 is, for example, a thermosetting resin having a high insulating property. Examples of the binder 13 include an epoxy resin, a polyimide resin, a polystyrene (PS) resin, a high-density polyethylene (HDPE) resin, a polyoxymethylene (POM) resin, a polycarbonate (PC) resin, a polyvinylidene fluoride (PVDF) resin, a phenolic resin, a polytetrafluoroethylene (PTFE) resin, or a polybenzoxazole (PBO) resin. The binder 13 may also be glass or other materials and may contain insulating fillers.

The conductor 25 is formed in a pattern. In the embodiment shown, the conductor 25 is wound around the coil axis Ax (see FIG. 1). When seen from above, the conductor 25 has, for example, an elliptic shape, a meander shape, a linear shape or a combined shape of these. The conductor 25 may have any shape such as a spiral shape.

The conductor 25 is formed of Cu, Ag, or any other conductive materials. The entire surface of the conductor 25 other than an end surface **25*a*2 and an end surface 25*b*2 may be coated with an insulating film. As shown, when the conductor 25 is wound around the coil axis Ax for a plurality of turns, each of the turns of the conductor 25 may be spaced from adjacent turns. In this arrangement, the base body 10** mediates between the adjacent turns.

The conductor 25 includes a lead-out conductor **25*a*1 at one end portion thereof and a lead-out conductor 25*b*1 at the other end portion thereof. The lead-out conductor 25*a*1 has the end surface 25*a*2 at an end portion thereof, and the lead-out conductor 25*b*1 has the end surface 25*b*2 at an end portion thereof. The lead-out conductor 25*a*1 at one end portion of the conductor 25 is electrically connected to the external electrode 21, and the lead-out conductor 25*b*1 at the other end portion of the conductor 25 is electrically connected to the external electrode 22**.

In one embodiment of the present invention, the external electrode 21 extends on a part of the first principal surface **10*a*, the second principal surface 10*b*, the second end surface 10*d*, the first side surface 10*e*, and the second side surface 10*f* of the base body 10. The external electrode 22 extends on a part of the first principal surface 10*a*, the second principal surface 10*b*, the first end surface 10*c*, the first side surface 10*e*, and the second side surface 10*f* of the base body 10. The external electrodes 21, 22 are spaced apart from each other. Shapes and arrangements of the external electrodes 21, 22 are not limited to those in the example shown. Both the lead-out conductor 25*a*1 and the lead-out conductor 25*b*1 lead to the first principal surface (the mounting surface) 10*a* of the base body 10, and the end surface 25*a*2 of the lead-out conductor 25*a*1 and the end surface 25*b*2 of the lead-out conductor 25*b*1 are exposed from the base body 10 through the first principal surface 10*a*. That is, the end surface 25*a*2 of the lead-out conductor 25*a*1 and the end surface 25*b*2 of the lead-out conductor 25*b*1 are exposed from the base body 10 through the same surface. It is also possible that the end surface 25*a*2 of the lead-out conductor 25*a*1 and the end surface 25*b*2 of the lead-out conductor 25*b*1 are exposed from the base body 10** through different surfaces.

Figure 3:
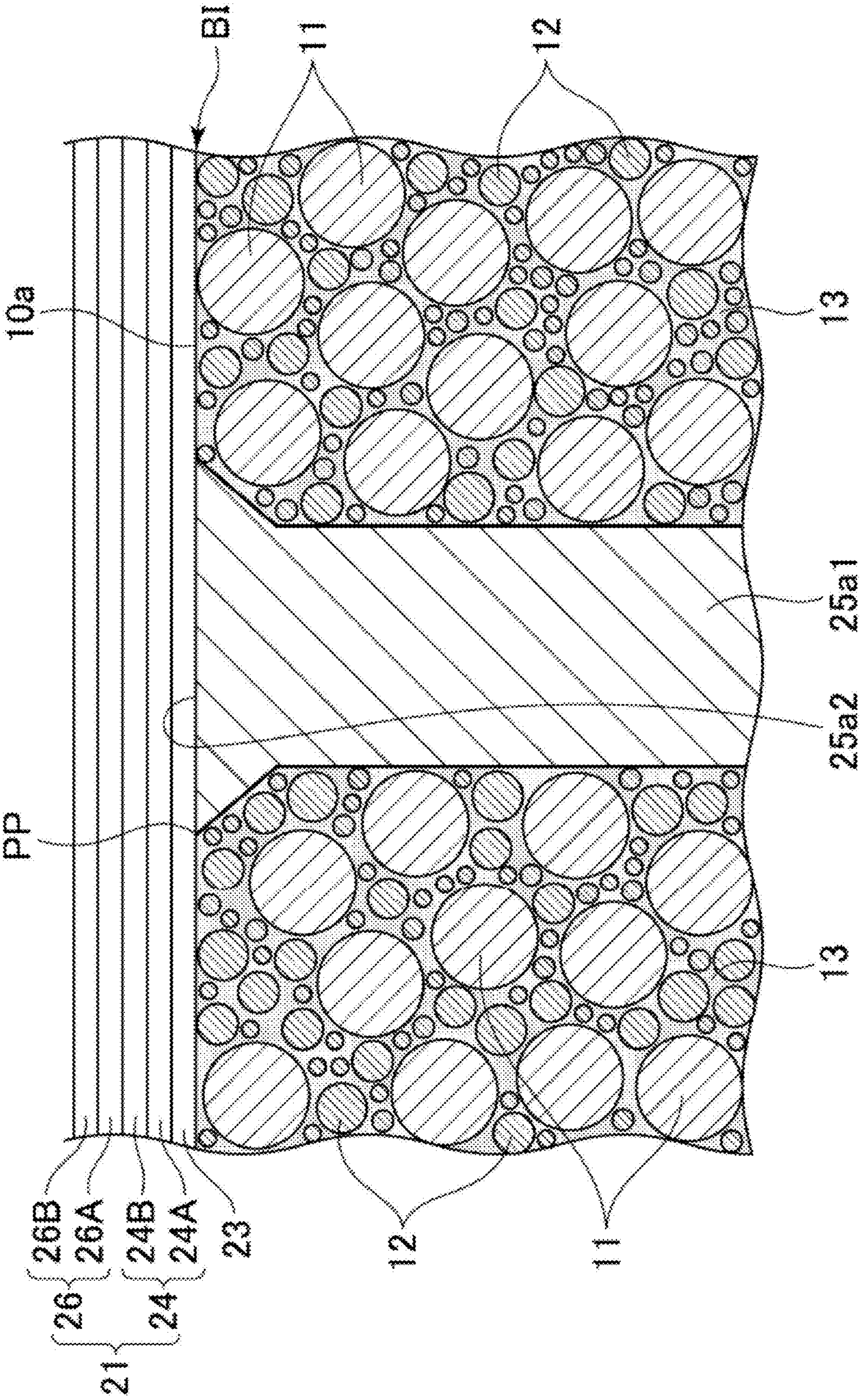
FIG. 3 is an enlarged sectional view showing, on an enlarged scale, a sectional surface around the joint between one end portion of a conductor and an external electrode in the coil component shown in FIG. 1.
Figure 4:
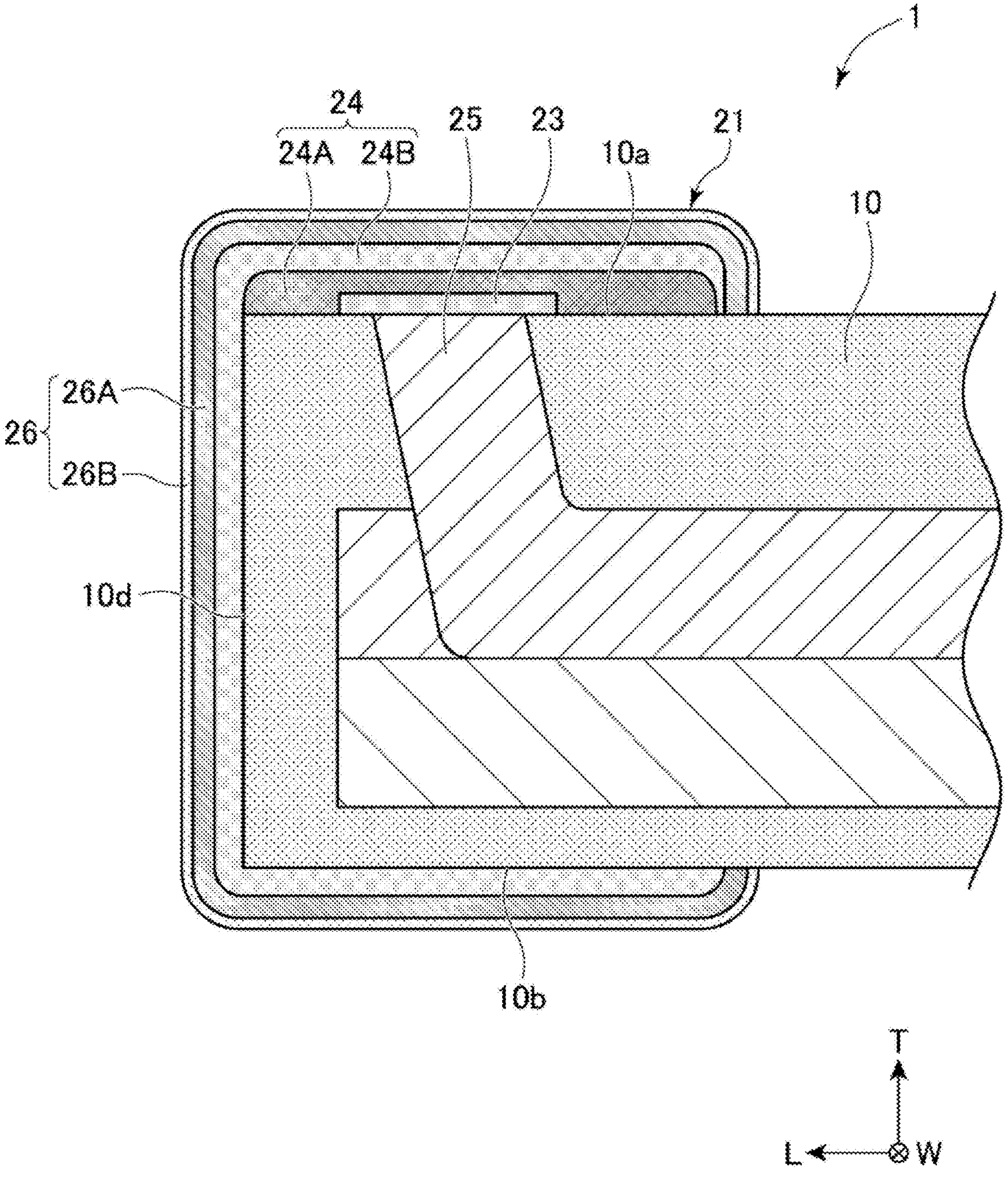
FIG. 4 is a sectional view showing the external electrode and the conductor of the coil component shown in FIG. 1.
Figure 5:
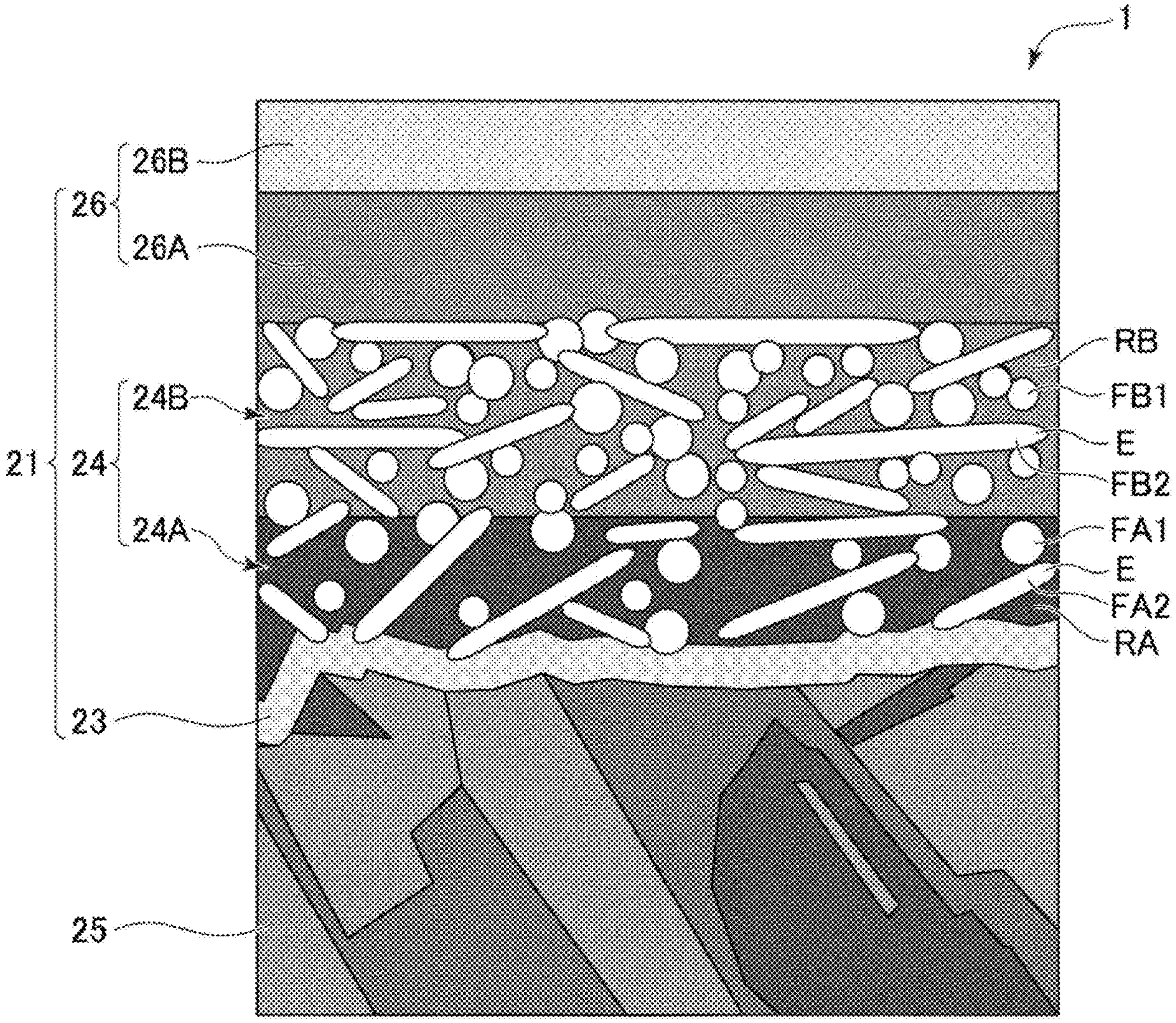
FIG. 5 is a schematic view showing an electron microscopy image of a sectional surface of the external electrode in the coil component shown in FIG. 1.

Next, the external electrodes of the coil component 1 according to one embodiment of the present invention will be hereinafter described with reference to FIGS. 3, 4, and 5. FIG. 3 is an enlarged sectional view showing, on an enlarged scale, a sectional surface around the joint between one end portion of the conductor 25 and the external electrode 21 in the coil component 1 shown in FIG. 1. FIG. 4 is a sectional view showing the external electrode 21 and the conductor 25 of the coil component 1. FIG. 5 is a schematic view showing an electron microscopy image of a sectional surface of the external electrode in the coil component shown in FIG. 1. The following description on the external electrode 21 also applies to the external electrode 22 unless in specific cases. Also, FIGS. 3 to 5, which show the external electrode 21, also apply to the external electrode 22. As shown in FIGS. 3 to 5, the external electrode 21 includes a metal film 23, an electrode layer 24, and a plating layer 26. The metal film 23, the electrode layer 24, and the plating layer 26 are stacked in this order on the first principal surface **10*a* of the base body 10 through which one end portion of the conductor 25 (that is, the end surface 25*a*2) is exposed. The lamination direction extends in a direction perpendicular to the surface of the base body 10 (the first principal surface 10*a* in the example shown) through which one end portion of the conductor 25 (that is, the end surface 25*a*2) is exposed. FIGS. 3 to 5 each show a sectional surface of the coil component 1** cut along the lamination direction.

The metal film 23 contacts with the first principal surface 10*a* and one end portion of the conductor 25. The metal film 23 is, for example, a sputtering film, and at least a part of the metal film 23 and at least a part of one end portion of the conductor 25 (the end surface 25*a*2) are connected with each other by metallic bond. The phrase "at least a part of one end portion of the conductor 25" mentioned here refers to some region of the end surface 25*a*2. For example, the metal film 23 and the end portion 25*a*1 may be connected with each other by metallic bond at a peripheral portion PP of the end surface 25*a*2 (see FIG. 3). FIG. 3 shows an example in which the metal film 23 and the end portion 25*a*1 of the conductor 25 are connected with each other by metallic bond at the entirety of the end surface 25*a*2. In the example shown in FIG. 3, the region of the end surface 25*a*2 at which the metal film 23 and the end portion 25*a*1 are metal-bonded to each other includes the peripheral portion PP.

The metal film 23 is made of, for example, a metal such as Ag, Au, Pd, Pt, Cu, Ni, Ti, and Ta or an alloy of these metals. Metals suitable for the metal film 23 are those less apt to oxidation or ready to be reduced after oxidation. The metal film 23 is preferably made of a material having a low volume resistivity. The thickness of the metal film 23 is not particularly limited but may be, for example, 0.5 μm to 5 μm. The ionization tendency of the main ingredient of the metals contained in the metal film 23 is preferably smaller than that of the metal constituting the conductor 25. The phrase "the main ingredient of the metals contained in the metal film 23" refers to the metal ingredient that makes up more than a half of the metal species by weight percent among the metals contained in the metal film 23. When the metal film 23 contains one metal, this metal is the main ingredient. By way of one example, when the conductor 25 is made of Cu, the metal contained in the metal film 23 may be Ag.

The average of the aspect ratios of the metal particles contained in the metal film 23 is 0.8 to 1.5. An aspect ratio of a metal particle contained in the metal film 23 is B/a, where a is the dimension of the metal particle in the direction horizontal to the boundary interface BI, and B is the dimension of the metal particle in the direction perpendicular to the boundary interface BI. The average of the aspect ratios of the metal particles may be an average of the aspect ratios of, for example, five, ten, or other plural number of metal particles. The metal particles contained in the metal film 23 are metal-bonded to each other.

The electrode layer 24 is disposed on the metal film 23 and electrically connected to one end portion of the conductor 25. The electrode layer 24 includes a plurality of layers stacked together in the lamination direction. In the embodiment shown, the electrode layer 24 includes a first electrode layer 24A and a second electrode layer 24B covering the first electrode layer 24A. In the lamination direction, the second electrode layer 24B is disposed on the opposite side to the metal film 23 with respect to the first electrode layer 24A. In the embodiment shown, the first electrode layer 24A covers the metal film 23 and a part of the principal surface 10*a* of the base body 10. The first electrode layer 24A needs to cover at least a part of the metal film 23. The first electrode layer 24A may also cover a part of the principal surface 10*a* of the base body 10 or may not cover the principal surface 10*a* of the base body 10. The second electrode layer 24B covers the entire outer surface of the first electrode layer 24A (that is, the surface not in contact with the metal film 23 and the base body 10) and a part of the second principal surface 10*b*, the second end surface 10*d*, the first side surface 10*e*, and the second side surface 10*f* of the base body 10. The second electrode layer 24B included in the external electrode 22 covers the entire outer surface of the first electrode layer 24A (that is, the surface not in contact with the metal film 23 and the base body 10) and a part of the second principal surface 10*b*, the first end surface 10*c*, the first side surface 10*e*, and the second side surface 10*f* of the base body 10. The first electrode layer 24A has a thickness of, for example, about 10 μm to 20 μm, and the second electrode layer 24B has a thickness of, for example, about 20 μm to 30 μm. The interface between the first electrode layer 24A and the second electrode layer 24B may be the boundary between the resin R contained in the first electrode layer 24A and the resin R contained in the second electrode layer 24B. The boundary between the resin R contained in the first electrode layer 24A and the resin R contained in the second electrode layer 24B can be confirmed by observation under an optical microscope, for example.

The electrode layer 24 (that is, the first electrode layer 24A and the second electrode layer 24B) contain a plurality of fillers F and the resin R. In the following description, the fillers contained in the first electrode layer 24A are referred to as fillers FA, the fillers contained in the second electrode layer 24B are referred to as fillers FB, the resin contained in the first electrode layer 24A is referred to as a resin RA, and the resin contained in the second electrode layer 24B is referred to as a resin RB. The proportion of the volume of the fillers FB in the second electrode layer 24B is larger than the proportion of the volume of the fillers FA in the first electrode layer 24A. In one or more embodiments of the present invention, the comparison between the volume of the fillers FB in the first electrode layer 24A and the volume of the fillers FB in the second electrode layer 24B can be made by comparing the proportion of the area of the fillers FA relative to the area of the first electrode layer 24A with the proportion of the area of the fillers FB relative to the area of the second electrode layer 24B in a sectional surface of the external electrode 21 cut along a plane extending along the lamination direction (in other words, a plane extending parallel to the lamination direction). When the proportion of the area of the fillers FB relative to the area of the second electrode layer 24B is larger than the proportion of the area of the fillers FA relative to the area of the first electrode layer 24A, the proportion of the volume of the fillers FB in the second electrode layer 24B is larger than the proportion of the volume of the fillers FA in the first electrode layer 24A. The area of the first electrode layer 24A refers to the sum of the area of the fillers FA and the area of the resin RA, both contained in the first electrode layer 24A. The area of the second electrode layer 24B refers to the sum of the area of the fillers FB and the area of the resin RB, both contained in the second electrode layer 24B. The areas of the first electrode layer 24A, the second electrode layer 24B, the fillers FA, the fillers FB, the resin RA, and the resin RB in a sectional surface of the external electrode 21 cut along a plane extending along the lamination direction (in other words, a plane extending parallel to the lamination direction) can be measured by image processing in a scanning electron microscope (SEM) photograph obtained by imaging the sectional surface with a SEM. The fillers FA contained in the first electrode layer 24A include a plurality of first fillers FA1 and a plurality of second fillers FA2. Likewise, the fillers FB contained in the second electrode layer 24B include a plurality of first fillers FB1 and a plurality of second fillers FB2. Each of the plurality of first fillers FA1, FB1 has a spherical shape with an aspect ratio of 2 or smaller. Each of the plurality of second fillers FA2, FB2 has a flat shape with an aspect ratio of 3 or larger. The aspect ratios mentioned herein refer to a ratio of the dimension in the short axis direction to the dimension in the long axis direction of a filler F (that is, a value obtained by dividing the maximum particle size by the minimum particle size) in the sectional surface of the electrode layer 24 in the thickness direction thereof. In the sectional surface of the electrode layer 24 in the thickness direction thereof, the average of the maximum particle sizes of the second fillers FA2, FB2 is larger than the average of the maximum particle sizes of the first fillers FA1, FB1. The average of the maximum particle sizes of the first fillers FA1, FB1 is, for example, 1 μm to 10 μm, and the average of the maximum particle sizes of the second fillers FA2, FB2 is, for example, 0.1 μm to 10 μm. Among the plurality of fillers FA in the first electrode layer 24A, the proportion of the first fillers FA1 is 30 vol % to 70 vol %, and the proportion of the second fillers FA2 is 30 vol % to 70 vol %. Among the plurality of fillers FB in the second electrode layer 24B, the proportion of the first fillers FB1 is 40 vol % to 70 vol %, and the proportion of the second fillers FB2 is 30 vol % to 60 vol %.

The first fillers FA1, FB1 and the second fillers FA2, FB2 are formed of a metal material having a high electrical conductivity such as Ag, Cu, Au, Pd, or Ni. Alternatively, the first fillers FA1, FB1 and the second fillers FA2, FB2 may be formed of an alloy such as AgPd, brass, or bronze. The first fillers FA1, FB1 and the second fillers FA2, FB2 may be metal fillers coated with a film of a low resistance metal such as Ag. Further, the first fillers FA1, FB1 and the second fillers FA2, FB2 contain a same metal as an ingredient. In the embodiment shown, both the first fillers FA1, FB1 and the second fillers FA2, FB2 are formed of Ag. It is also possible that the first fillers FA1, FB1 and the second fillers FA2, FB2 contain different metals, or the first fillers FA1, FB1 and the second fillers FA2, FB2 are formed only of different metals. Further, it is also possible that the first fillers FA1 contained in the first electrode layer 24A and the first fillers FB1 contained in the second electrode layer 24B contain different metals, or the first fillers FA1 and the first fillers FB1 are formed only of different metals. Likewise, it is also possible that the second fillers FA2 contained in the first electrode layer 24A and the second fillers FB2 contained in the second electrode layer 24B contain different metals, or the second fillers FA2 and the second fillers FB2 are formed only of different metals. Even when the first fillers FA1, FB1 and the second fillers FA2, FB2 contain different metals, the first fillers FA1, FB1 and the second fillers FA2, FB2 are metal-bonded to each other, and the bonding portion between the first fillers FA1, FB1 and the second fillers FA2, FB2 are alloyed. In this case, the combination of the metal contained in the first fillers FA1, FB1 and the metal contained in the second fillers FA2, FB2 is preferably selected such that the bond strength is larger than that of the metallic bond between the same metals. The bond strength of an alloy made by a combination of different metals is apparent in known literatures.

The first fillers FA1, FB1 in the first electrode layer 24A and the second fillers FA2, FB2 in the second electrode layer 24B undergo heat treatment in the manufacturing process of the coil component 1. This causes the first fillers FA1, FB1 and the second fillers FA2, FB2 to be metal-bonded to each other. The first electrode layer 24A and the second electrode layer 24B may include portions in which the second fillers FA2, FB2 are metal-bonded to each other with the long axes thereof oriented parallel to each other. The first electrode layer 24A and the second electrode layer 24B may include portions in which the first fillers FA1, FB1 are metal-bonded to each other. In the interface between the first electrode layer 24A and the metal film 23, the second fillers FA2 are metal-bonded to the metal film 23. This causes the first electrode layer 24A to be electrically connected to the metal film 23. Further, in the interface between the second electrode layer 24B and the plating layer 26, the second fillers FB2 are metal-bonded to the plating layer 26. The long axis direction of each second filler FB2 is substantially parallel to the direction perpendicular to the thickness direction of the electrode layer 24. This causes the second electrode layer 24B to be electrically connected to the plating layer 26. Likewise, the first fillers FA1 in the first electrode layer 24A may be metal-bonded to the metal film 23. The first fillers FB1 in the second electrode layer 24B may be metal-bonded to the plating layer 26.

The resin RA contained in the first electrode layer 24A and the resin RB contained in the second electrode layer 24B are, for example, thermosetting resins. The thermosetting resins may be those commonly used for bonding application or the like, and examples of such thermosetting resins include epoxy resins, acrylic resins, phenolic resins, cyanate resins, amino resins, oxetane resins, silicon-modified organic resins, polyimide resins, maleimide resins, and BT (bismaleimide triazine) resins. Each of the first electrode layer 24A and the second electrode layer 24B may contain two or more thermosetting resins. The resin RA contained in the first electrode layer 24A and the resin RB contained in the second electrode layer 24B may be either the same or different. In one or more embodiments of the present invention, the proportion of the volume of the resin RA in the first electrode layer 24A is larger than the proportion of the volume of the resin RB in the second electrode layer 24B. The comparison between the volume of the resin RA in the first electrode layer 24A and the volume of the resin RB in the second electrode layer 24B can be made by comparing the proportion of the area of the resin RA relative to the area of the first electrode layer 24A with the proportion of the area of the resin RB relative to the area of the second electrode layer 24B in a sectional surface of the external electrode 21 cut along a plane extending along the lamination direction. When the proportion of the area of the resin RA relative to the area of the first electrode layer 24A is larger than the proportion of the area of the resin RB relative to the area of the second electrode layer 24B, the proportion of the volume of the resin RA in the first electrode layer 24A is larger than the proportion of the volume of the resin RB in the second electrode layer 24B. This makes the adhesion strength between the first electrode layer 24A and the base body 10 higher than the adhesion strength between the second electrode layer 24B and the base body 10. The proportion of the resin RA in the first electrode layer 24A is 65 vol % or smaller. The proportion of the resin RA in the first electrode layer 24A is preferably 30 to 65 vol %. Further, the proportion of the resin RA in the first electrode layer 24A is more preferably smaller than 65 vol %. The proportion of the resin RB in the second electrode layer 24B is 60 vol % or smaller. The proportion of the resin RB in the second electrode layer 24B is preferably 25 to 60 vol %. Further, the proportion of the resin RB in the second electrode layer 24B is more preferably smaller than 55 vol %.

The first electrode layer 24A is formed from a first conductive paste that contains first metal particles to be the first fillers FA1, second metal particles to be the second fillers FA2, and an unset resin. The second electrode layer 24B is formed from a second conductive paste that contains first metal particles to be the first fillers FB1, second metal particles to be the second fillers FB2, and an unset resin. The first conductive paste and the second conductive paste are different in the proportions of the first metal particles and the second metal particles contained therein. The first metal particles and the second metal particles are the first fillers FA1, FB1 and the second fillers FA2, FB2, respectively, yet to be metal-bonded by the heat treatment in the manufacturing process of the coil component 1. Each of the second metal particles has a flat shape, and the curvature of the outer shape of each second metal particle is smallest at the opposite end portions E in the respective long axis direction. The average of the minimum radii of curvature of the second metal particles (that is, the curvatures of the end portions of the second metal particles in the respective long axis directions) is equal to or smaller than that of the first metal particles of 0.5 μm. By way of one example, the average of the minimum radii of curvature of the second metal particles is 0.1 μm or smaller. In FIG. 5, the end portions of the second fillers FA2, FB2 metal-bonded by the heat treatment are denoted as the end portions E of the second metal particles. FIG. 5 schematically shows the boundaries of the end portions of the second fillers FA2, FB2 that are metal-bonded. The boundaries of the end portions of the second fillers FA2, FB2 can be sighted by, for example, observing a sectional surface of the electrode layer 24 including the second fillers FA2, FB2 under an electron microscope at a magnification of 50,000. In actual observations, the boundaries of the end portions of the second fillers FA2, FB2 may not be observed clearly. For example, when an end portion of a second filler FA2, FB2 is bonded to a first filler FA1, FB1 or another second filler FA2, FB2, the boundary may not be observed clearly. In such a case, the boundary of the second filler FA2, FB2 may be set at the boundary of the crystal grains in the second filler FA2, FB2 that can be observed under an electron microscope. When the boundary of the crystal grains in the second filler FA2, FB2 cannot be observed clearly, the boundary of the end portion of the second filler FA2, FB2 may be set at a curved line estimated by any known estimation method from the shape of a portion of the second filler FA2, FB2 other than the end portion that cannot be observed clearly.

The plating layer 26 is disposed on the second electrode layer 24B. The plating layer 26 covers the entire outer surface of the second electrode layer 24B (that is, the surface not in contact with the first electrode layer 24A and the base body 10). In the embodiment shown, the plating layer 26 has multilayer structure including a first plating layer 26A and a second plating layer 26B. The first plating layer 26A contacts with the second electrode layer 24B, and the second plating layer 26B is disposed on the first plating layer 26A. The first plating layer 26A has a thickness of, for example, 5 μm to 7 μm, and the second plating layer 26B has a thickness of, for example, 5 μm to 10 μm. The first plating layer 26A is formed of Ni for example, and the second plating layer 26B is formed of Sn for example. The first plating layer 26A may also be formed of a metal or an alloy besides Ni, that forms a barrier layer corrosion-resistant to heat treatment in soldering. The second plating layer 26B may also be formed of a metal or an alloy besides Sn, that has a high solder wettability. The plating layer 26 may also be a single-layer plating layer formed of a material including Ni or Sn.

Figure 6:
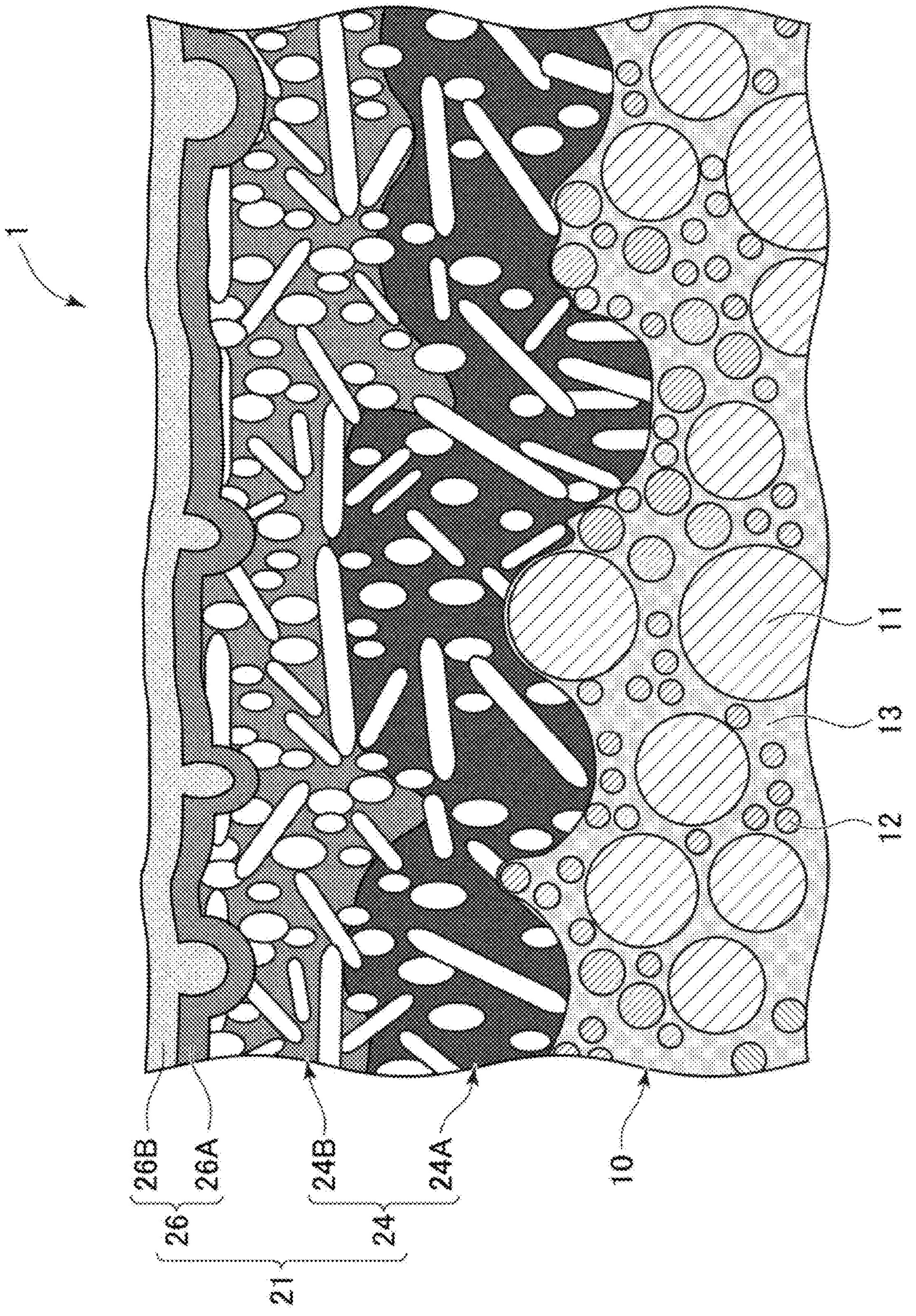
FIG. 6 is an enlarged sectional view schematically showing a sectional surface of the joint between the base body and the external electrode of the coil component shown in FIG. 1.

FIG. 6 is a sectional view showing, on an enlarged scale, a sectional surface of the joint between the base body 10 and the external electrode 21 in the coil component 1. As shown in FIG. 6, the surface of the base body 10 has a plurality of indentations produced by removal of the first metal magnetic particles 11 and/or the second metal magnetic particles 12. Therefore, the interface between the base body 10 and the first electrode layer 24A has a plurality of indentations, which produce the anchor effect to bind together the base body 10 and the first electrode layer 24A. Likewise, each of the interface between the first electrode layer 24A and the second electrode layer 24B, the interface between the second electrode layer 24B and the first plating layer 26A, and the interface between the first plating layer 26A and the second plating layer 26B also has a plurality of indentations, which produce the anchor effect to bind together the first electrode layer 24A and the second electrode layer 24B, the second electrode layer 24B and the first plating layer 26A, and the first plating layer 26A and the second plating layer 26B. This improves the strength of the entirety of the external electrodes 21, 22.

Next, a description is given of a manufacturing method of the coil component 1 according to one embodiment of the invention. First, the conductor 25 formed of a metal material or the like and having a coil shape is placed into a mold, along with a mixed resin composition prepared by mixing and kneading particles including the first metal magnetic particles 11 and the second metal magnetic particles 12 with the binder 13 composed of a resin or the like. The work is then compression molded such that the end surface **25*a*2 of the lead-out conductor 25*a*1 and the end surface 25*b*2 of the lead-out conductor 25*b*1 of the conductor 25 are exposed through the surface. The coil shape of the conductor 25 is not particularly limited. For example, the conductor 25 is made of a wire wound in a spiral shape, or it may be made of a planar coil instead of the wound wire. The conductor 25 may have an insulating coat. The resin in the molded product is cured to obtain the base body 10 having the conductor 25** embedded therein.

Next, the surface of the magnetic base body 10 in which the end surface **25*a*2 of the lead-out conductor 25*a*1 and the end surface 25*b*2 of the lead-out conductor 25*b*1 of the conductor 25 are exposed is smoothed to remove oxides. By way of an example, the surface of the magnetic base body 10 may be polished with an abrasive and then subjected to plasma etching. The particle size of the abrasive should preferably be smaller than that of the first metal magnetic particles 11. For example, when the average particle size of the first metal magnetic particles 11** is 30 μm, an abrasive having a particle size of 25 μm is selected. Any etching method, such as plasma etching, is available that can remove oxides from the surface of the magnetic base body.

Next, the metal film 23 is formed. One example of the method of forming the metal film 23 is sputter deposition, or in particular, high density sputter deposition. In high density sputter deposition, a large electric power is applied for a short period to form a dense film while preventing overheating of the sputtered film. The sample may be cooled during sputtering, such that a larger electric power can be applied to form more dense sputtered film. With the above metals used in this method, the metal film 23 can be formed efficiently at a high sputtering yield. The metal film formed by sputter deposition is herein referred to as a sputtered film. The metal film 23 may alternatively be formed by methods other than sputter deposition that are capable of metal-bonding the end surface **25*a*2 of the conductor 25 to the metal film 23**.

Next, the electrode layer 24 is formed on the metal film 23. In forming the electrode layer 24, the first electrode layer 24A is formed first. The first step to form the first electrode layer 24A is to prepare a first conductive paste that contains first metal particles to be the first fillers FA1 and second metal particles to be the second fillers FA2. The next step is to form a layer of the first conductive paste by the printing or other method. A heat treatment or other process follows to metal-bond the first metal particles and the second metal particles contained in the layer of the first conductive paste. By way of one example, the heat treatment is performed under the conditions of 170 to 250° C. and 30 to 60 minutes. In addition, the heat treatment is performed in a low-oxygen or reducing atmosphere, depending on the substances of the first fillers FA1 and the second fillers FA2. Subsequently, the second electrode layer 24B is formed on the first electrode layer 24A. In forming the second electrode layer 24B, the printing or other method is used to form a layer of a second conductive paste that contains first metal particles to be the first fillers FB1 and second metal particles to be the second fillers FB2. A heat treatment or other process follows to metal-bond the first metal particles and the second metal particles contained in the layer of the second conductive paste. The heat treatment on the second conductive paste is performed, for example, under the same conditions as the heat treatment on the first conductive paste. Through these steps, the electrode layer 24 is formed that is electrically connected to the end portion of the conductor 25 via the metal film 23.

Lastly, plating is performed to form the first plating layer 26A and the second plating layer 26B. Through the process described above, the external electrodes 21, 22 are formed, and thus the coil component 1 is manufactured. The coil component 1 manufactured is mounted on the circuit board by soldering the external electrodes 21, 22 to the corresponding land portions of the circuit board.

As described above, the external electrodes 21, 22 of the coil component 1 includes the first electrode layer 24A, the second electrode layer 24B covering the first electrode layer 24A, and the plating layer 26 covering the second electrode layer 24B, and the proportion of the volume of the fillers FB in the second electrode layer 24B is larger than the proportion of the volume of the fillers FA in the first electrode layer 24A. In order to improve the tight adhesion between the electrode layer 24 and the base material 10, it is commonly desirable to increase the proportion of the resin R contained in the electrode layer 24. However, when the electrode layer 24 contains a larger proportion of resin R, a structural defect tends to form in the plating layer 26 being grown on the electrode layer 24, possibly reducing the adhesion strength between the electrode layer 24 and the plating layer 26. In the coil component 1 according to one embodiment of the present invention, the proportion of the volume of the fillers FA in the first electrode layer 24A that contacts with the base body 10 is relatively small (in other words, the proportion of the volume of the resin RA is relatively large), such that the adhesion strength with the base body 10 is ensured. On the other hand, the proportion of the volume of the fillers FB in the second electrode layer 24B that contacts with the plating layer 26 is relatively large (in other words, the proportion of the volume of the resin RB is relatively small), such that it can be inhibited that a structural defect forms when the plating layer 26 is grown on the second electrode layer 24B. Accordingly, the adhesion strength between the electrode layer 24 and the base body 10 can be ensured, and simultaneously, the adhesion strength between the electrode layer 24 and the plating layer 26 can be increased.

The plurality of fillers FA, FB in the electrode layer 24 may include the first fillers FA1, FB1 having a spherical shape and the second fillers FA2, FB2 having a flat shape. The aspect ratio of the first fillers FA1, FB1 may be 2 or smaller, and the aspect ratio of the second fillers FA2, FB2 may be 3 or larger. Since each second filler FA2, FB2 has a flat shape, the curvature of each second filler FA2, FB2 is small at the opposite end portions E thereof in the respective long axis direction and is large at the middle portion thereof in the respective long axis direction. Therefore, the amount of energy required for the metallic bond by the heat treatment is small at the opposite end portions E of each second filler in the respective long axis direction and is large at the middle portion thereof in the respective long axis direction. Accordingly, the bonding by the metallic bond is facilitated at the opposite end portions E of each second filler in the respective long axis direction and is retarded at the middle portion thereof in the respective long axis direction. This makes it possible to inhibit the first fillers FA1, FB1 and the second fillers FA2, FB2 from aggregating when metal-bonded by the heat treatment, while ensuring the electric connection by the opposite end portions E of each second filler FA2, FB2 in the respective long axis direction. As a result, the first fillers FA1, FB1 and the second fillers FA2, FB2 are inhibited from being unevenly distributed in the electrode layer 24, and thus the reduction of the strength of the external electrodes 21, 22 can be inhibited.

Among the plurality of fillers FB in the second electrode layer 24B, the proportion of the first fillers FB1 may be 40 vol % to 70 vol %, and the proportion of the second fillers FB2 may be 30 vol % to 60 vol %. Thus, in the distribution state of the fillers FB and the resin RB in the second electrode layer 24B, the resin RB can fill the space between the aggregates of the fillers FB, including the first fillers FB1 and the second fillers FB2, without segregation. In particular, the resin RB can be inhibited from segregation around the bonding interface between the plating layer 26 and the second electrode layer 24B.

At least a part of the plurality of fillers F contained in the second electrode layer 24B may be metal-bonded to the plating layer 26. This reduces the electrical resistance between the plating layer 26 and the second electrode layer 24B.

Figure 7A:
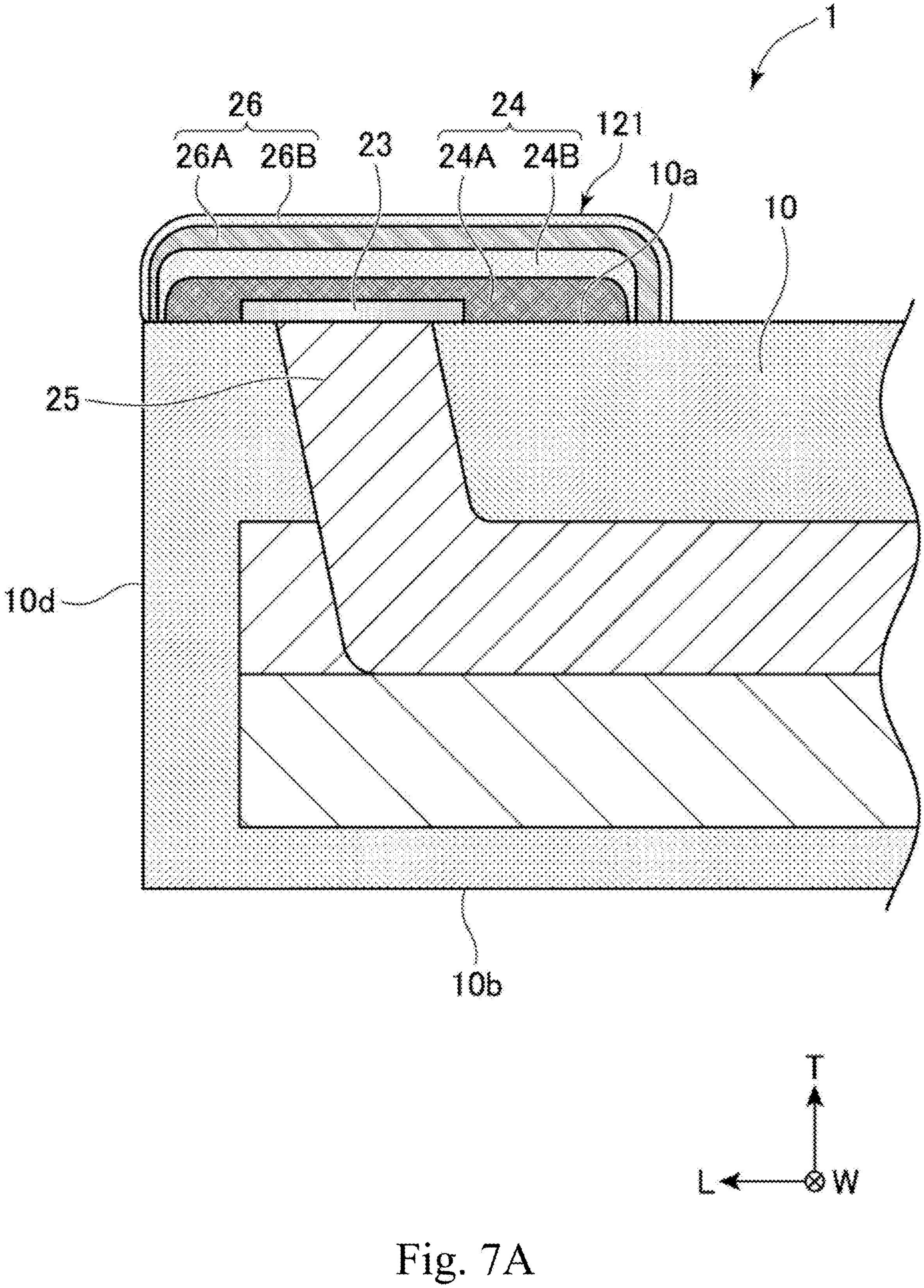
FIG. 7A is a sectional view schematically showing another embodiment of the external electrode of the coil component of the present invention.
Figure 7B:
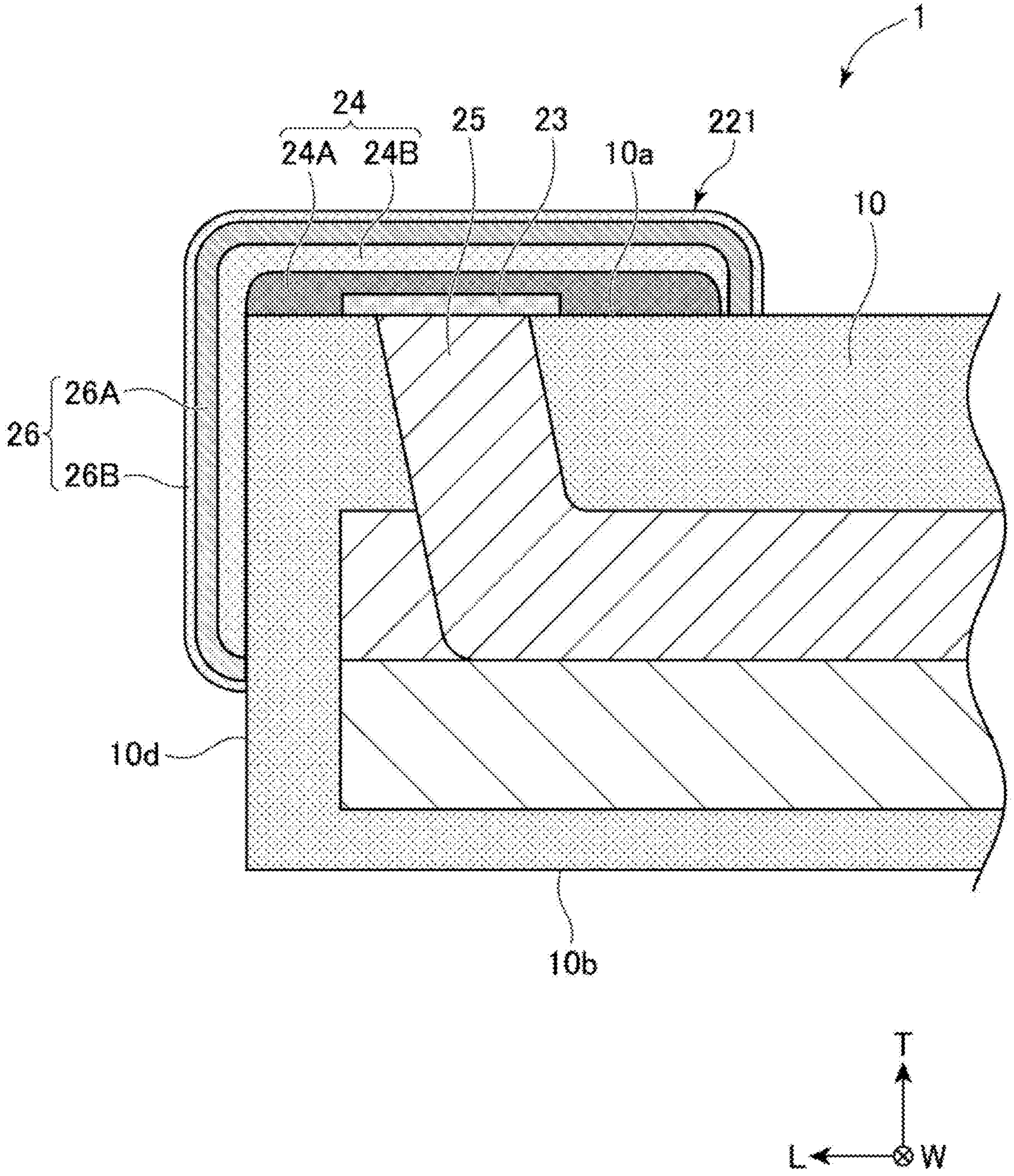
FIG. 7B is a sectional view schematically showing another embodiment of the external electrode of the coil component of the present invention.

Another embodiment of the external electrodes 21, 22 of the coil component 1 will be hereinafter described with reference to FIGS. 7A and 7B. FIGS. 7A and 7B are sectional views each schematically showing another embodiment of the external electrodes of the coil component 1. As shown in FIG. 7A, the external electrode 121 according to the other embodiment may be provided on only a part of the first principal surface 10*a* of the base body 10. In this case, the plating layer 26 covers only the outer surface of the second electrode layer 24B of the external electrode 121. Further, as shown in FIG. 7B, the external electrode 221 according to the other embodiment may be provided on only a part of the first principal surface 10*a* and the second end surface 10*d* of the base body 10. In this case, the plating layer 26 covers the outer surface of the second electrode layer 24B of the external electrode 221 and a part of the second end surface 10*d*.

Figure 8:
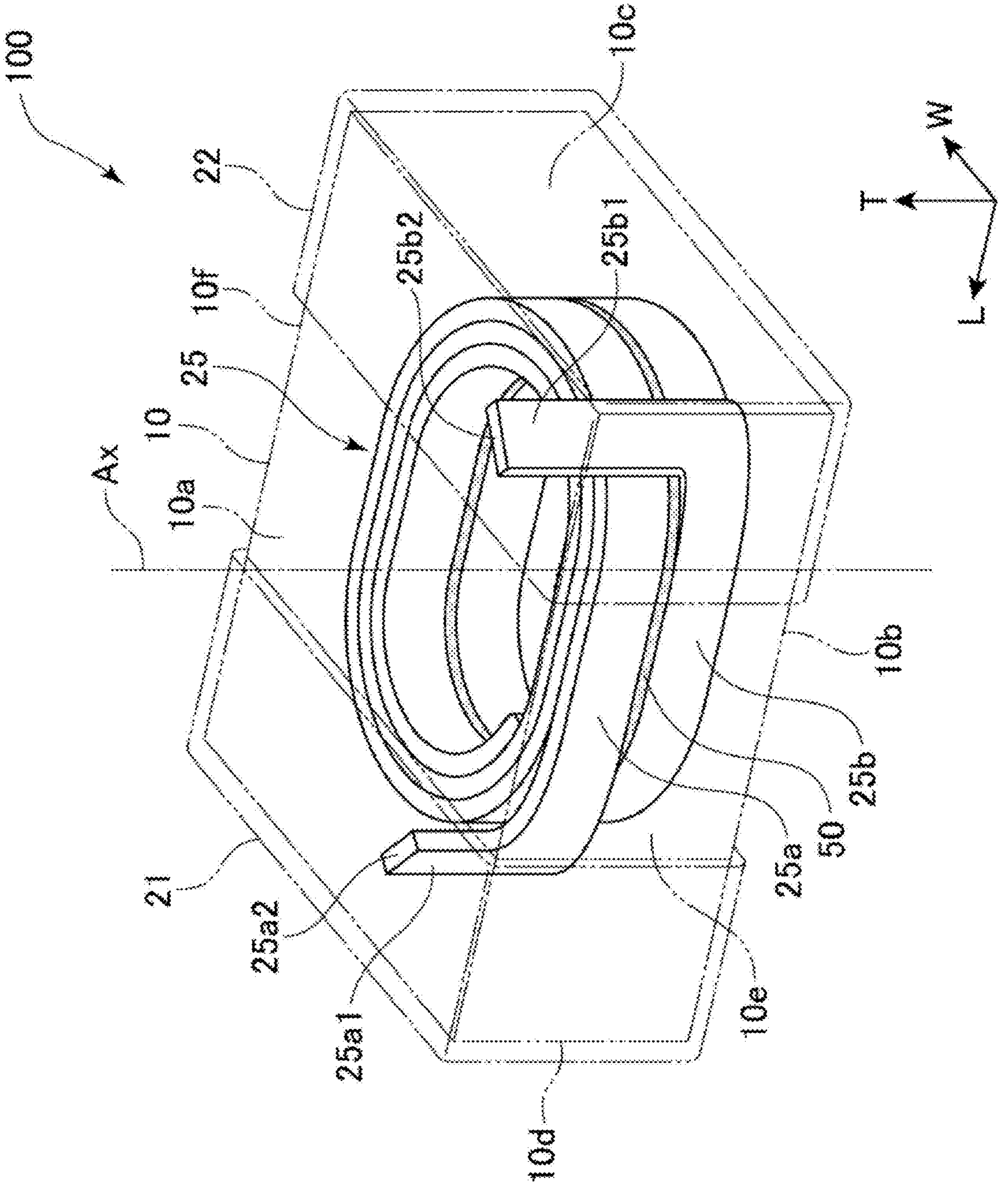
FIG. 8 is a perspective view schematically showing a coil component according to another embodiment of the present invention.

Next, a description is given of a coil component 100 according to another embodiment of the present invention with reference to FIG. 8. FIG. 8 is a perspective view schematically showing the coil component 100. As shown, similarly to the coil component 1, the coil component 100 includes a base body, a coil conductor 25 provided in the base body 10, an external electrode 21 disposed on a surface of the base body 10, and an external electrode 22 disposed on the surface of the base body 10 at a position spaced from the external electrode 21. The coil component 100 is different from the coil component 1 in that it includes an insulating plate 50 and two conductors 25. The insulating plate 50 is provided in the base body 10, and the two conductors 25 are provided on the top-side surface and the bottom-side surface of the insulating plate 50, respectively.

As in the coil component 1, the external electrodes 21, 22 of the coil component 100 includes the first electrode layer 24A, the second electrode layer 24B covering the first electrode layer 24A, and the plating layer 26 covering the second electrode layer 24B, and the proportion of the volume of the fillers F in the second electrode layer 24B is larger than the proportion of the volume of the fillers F in the first electrode layer 24A. Accordingly, for the same reason as with the coil component 1, the adhesion strength between the electrode layer 24 and the base body 10 can be ensured, and simultaneously, the adhesion strength between the electrode layer 24 and the plating layer 26 can be increased.

The dimensions, materials, and arrangements of the constituent elements described for the above various embodiments are not limited to those explicitly described for the embodiments, and these constituent elements can be modified to have any dimensions, materials, and arrangements within the scope of the present invention. Furthermore, constituent elements not explicitly described herein can also be added to the above-described embodiments, and it is also possible to omit some of the constituent elements described for the embodiments.

For example, the external electrodes 21, 22 of the coil component 1 and the coil component 100 may not include the metal film 23. In this case, the electrode layer 24 and the end portion of the conductor 25 may be directly connected to each other.

What is claimed is:

1. A coil component comprising:

a base body containing a plurality of metal magnetic particles and a binder, the binder being made of a resin, the base body having a plurality of surfaces including a first surface;

an external electrode provided on the first surface of the base body; and a conductor electrically connected to the external electrode and wound around a coil axis in the base body, the conductor having a first end and a second end, the first end and the second end of the conductor being exposed from first surface of the base body, wherein the external electrode includes a first electrode layer, a second electrode layer covering the first electrode layer, and a plating layer covering the second electrode layer, the first electrode layer being in direct contact with the first surface of the base body, wherein each of the first electrode layer and the second electrode layer contains a plurality of fillers and a resin, and wherein a proportion of a volume of the plurality of fillers in the second electrode layer is larger than a proportion of a volume of the plurality of fillers in the first electrode layer.

2. The coil component of claim 1, wherein a proportion of a volume of the resin in the first electrode layer is larger than a proportion of a volume of the resin in the second electrode layer.

3. The coil component of claim 1, wherein adhesion strength between the first electrode layer and the base body is higher than adhesion strength between the second electrode layer and the base body.

4. The coil component of claim 1, wherein a proportion of the resin in the first electrode layer is 65 vol % or smaller.

5. The coil component of claim 1, wherein the plurality of fillers are formed of a metal material.

6. The coil component of claim 1, wherein the plurality of fillers include first fillers having a spherical shape and second fillers having a flat shape, and wherein an aspect ratio of the first fillers is 2 or smaller, and an aspect ratio of the second fillers is 3 or larger.

7. The coil component of claim 6, wherein among the plurality of fillers contained in the second electrode layer, a proportion of the first fillers is 40 vol % to 70 vol %, and a proportion of the second fillers is 30 vol % to 60 vol %.

8. The coil component of claim 1, wherein at least a part of the plurality of fillers contained in the second electrode layer is metal-bonded to the plating layer.

9. The coil component of claim 1, wherein the plating layer includes a first plating layer contacting with the second electrode layer and formed of Ni.

10. The coil component of claim 9, wherein the first plating layer covers an entire outer surface of the second electrode layer.

11. The coil component of claim 1, wherein the resin is a thermosetting resin.

12. A circuit board comprising the coil component of claim 1.

13. An electronic device comprising the circuit board of claim 12.

14. A coil component comprising:

a base body containing a plurality of metal magnetic particles and a binder, the binder being made of a resin, the base body having a plurality of surfaces including a first surface;

an external electrode provided on the first surface of the base body; and a conductor electrically connected to the external electrode and wound around a coil axis in the base body, the conductor having a first end and a second end, the first end and the second end of the conductor being exposed from first surface of the base body, wherein the external electrode includes a first electrode layer, a second electrode layer covering the first electrode layer, and a plating layer covering the second electrode layer, the first electrode layer being in direct contact with the first surface of the base body, the first electrode layer containing a plurality of first fillers and a first resin, the second electrode layer containing a plurality of second fillers and a second resin, wherein the first electrode layer, the second electrode layer, and the plating layer are stacked together in a lamination direction, and wherein in a sectional surface cut along a plane extending parallel to the lamination direction, a proportion of an area of the second fillers relative to an area of the second electrode layer is larger than a proportion of an area of the first fillers relative to an area of the first electrode layer.

15. The coil component of claim 14, wherein in a sectional surface cut along a plane extending parallel to the lamination direction, a proportion of an area of the first resin relative to the area of the first electrode layer is larger than a proportion of an area of the second resin relative to the area of the second electrode layer.

* * * * *